United States Patent Office 2,923,118
Patented Feb. 2, 1960

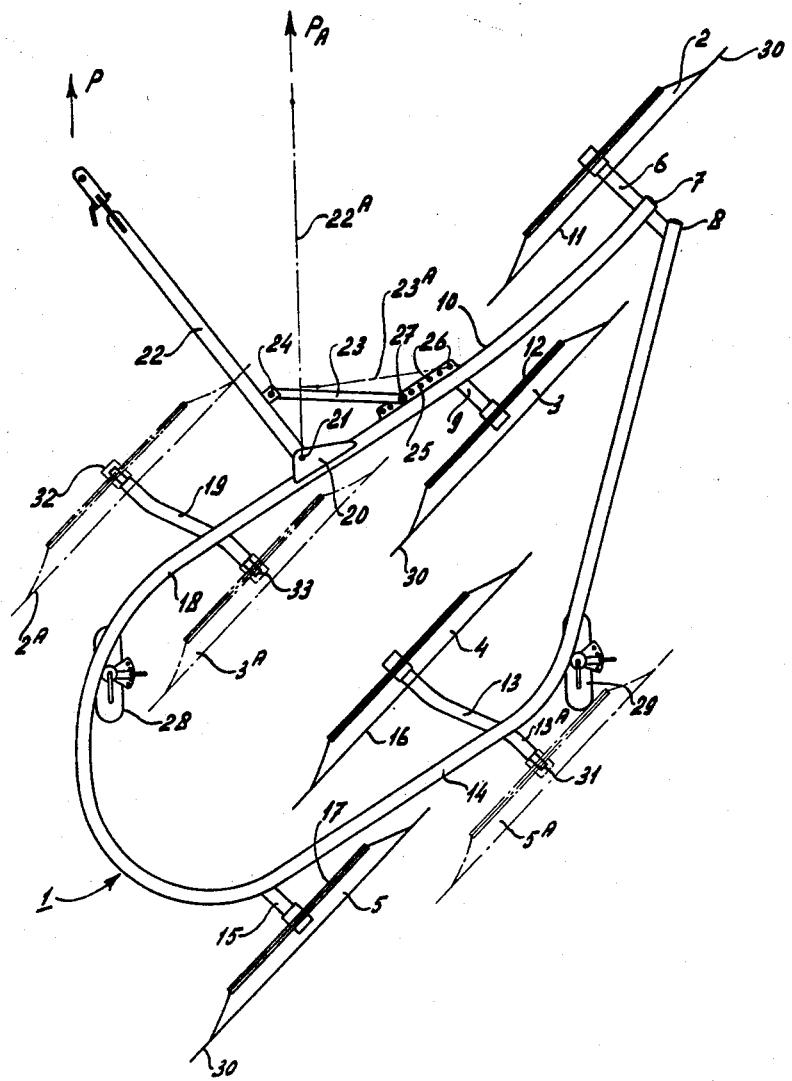

2,923,118

SIDE DELIVERY RAKE OR TEDDER

Cornelis van der Lely and Ary van der Lely, Maasland, Netherlands, assignors to C. van der Lely N.V., Maasland, Netherlands, a limited liability company of the Netherlands Application January 20, 1956, Serial No. 560,433

Claims priority, application Netherlands January 22, 1955

10 Claims. (Cl. 56—377)

The invention relates to devices for laterally displacing material lying on the ground. More particularly, the invention is concerned with the provision of a raking device consisting of a movable support supporting a plurality of rake wheels in bearing members arranged to provide a side delivery rake or a teddering device.

In known devices of this kind the direction of the bearing members, which are equal in number to the rake wheels, is adjustable with regard to an associated support. By adjusting the bearing members, the rake wheels can be arranged so that the associated device works as a side delivery rake or as a teddering device. This construction is, however, rather complicated and, generally, the device must be moved in different directions for different operations.

It is an object of the present invention to provide a simple and inexpensive device capable of operation as either a side delivery rake or as a teddering device.

It is a further object of the invention to provide a device having one normal direction of travel for different types of operation.

Another object of the invention is to provide a convertible device capable of supporting rake wheels in different alignments without a displacement of the associated supporting members.

For the purposes of the invention, a support is provided with auxiliary bearing members the number of which is at least one less than the number of rake wheels, the bearing members and the auxiliary bearing members having fixed positions with regard to the associated support and one of the rake wheels being mounted on the same bearing member in the side delivery and teddering arrangements.

Other objects of the invention will become apparent from the following description taken in conjunction with the accompanying drawing in which the sole figure is a plan view of a convertible device provided in accordance with the invention.

The device shown in the drawing consists of a support 1 which has the shape of a practically closed loop and is, for example, a loop-shaped tube to which some bearing members or bearings for four rake wheels 2, 3, 4 and 5 are attached. The bearing or axle 6 of the foremost rake wheel 2 connects the ends 7 and 8 of the opposite side portions 10, 18 and 14 of the tube 1 and supports the rake wheel at its free extremity. The bearing or axle 9 for the rake wheel 3 extends from the portion 10 of the tube 1 in a direction which is opposite to that of the bearing 6, so that the rake wheels 2 and 3 constitute a group of rake wheels the supports of which lie chiefly towards opposite sides 11 and 12 of the rake wheels. The first and second bearing members 6 and 9 are parallel.

The rake wheel 4 is situated on a bearing member 13 which is attached to the portion 14 of the tube 1 and extends to both sides thereof. The bearing member 15 for the rake wheel 5 is also attached to the tube portion 14, but only on the exterior thereof. The rake wheels 4 and 5 also constitute a group, the bearing members 13 and 15 of which lie chiefly on opposite sides 16 and 17 of the rake wheels. The third and fourth bearing members 13 and 15 are parallel.

At least one additional or fifth bearing member 19, serving as an auxiliary bearing member, is attached to the portion 18 of the tube 1 and extends on both sides of said tube portion.

An adjustable draw arm 22 which can be secured in desired position is mounted on the support between the tube portions 10 and 18 by means of a fastening member 20 and is rotatable about a vertical axle 21.

A rod 23 is hingedly connected at pivot 24 to the arm 22, and a strip 25 provided with a number of holes 26 is attached to the tube portion 10. The end of the rod 23 defines a hole 27 corresponding in size to the holes 26, so that a locking pin can be inserted through the hole 27 and one of the holes 26.

The support 1 is supported for ground traversing movement by two running wheels 28 and 29, the wheel planes of which are adjustable and securable in desired direction with regard to the support.

In the position shown by solid lines in the drawing, the rake wheels 2, 3, 4 and 5 are found in an aligned series in which the device works as a side delivery rake. With a force pulling the draw arm 22 in the direction of arrow P, the rake wheels occupy an oblique position relative to the travelling direction and, are rotated by their teeth 30 coming into contact with the ground and/or the material lying thereon. The rake wheels therefore deliver the material to the left. The rake wheels cooperate with each other and each sequential rake wheel receives laterally delivered material from the preceding rake wheel with the last rake wheel 5 depositing the material in a swath on the ground.

The bearing member 19 and the portion 13A of the bearing member 13 (said portion 13A projecting rearwardly of the portion 14 of the support) are used for arranging the rake wheels in the positions whereby the device works as a teddering device, the rake wheels 2, 3 and 5 being moved, but the rake wheel 4 remaining in unaltered position on that bearing which lies inside the loop. The rake wheel 5, for example, is mounted on the bearing 31 on bearing member 13—13A which lies outside of said loop, while the rake wheels 2 and 3, respectively, can be placed on the bearings 32 and 33 of the bearing member 19. In their new positions, the rake wheels are indicated by dotted lines and constitute an aligned series designated by reference characters 2A, 3A and 5A. The rake wheels 2A, 3A, 4 and 5A work independently of one another. If the draw arm 22 is put into position 22A and locked in said position by means of the rod 23A and if the device is then pulled forwards at the draw arm in direction $P_A$ (the same as P), each of the rake wheels 2A, 3A, 4 and 5A will deliver the material to the left independently of one another. Consequently, the four rake wheels deposit four very narrow swaths.

For controlling the width of the swaths in the arrangement as a side delivery rake as well as in the teddering device the direction of the running wheels 28 and 29 can be changed with regard to the support.

In summary, it will be noted that bearing members 13 and 19 and their associated bearings constitute an arrangement wherein is included a series of substantially coaxial bearings extending across the loop. Bearing members 6, 9, 13 and 15 provide an arrangement wherein is included a series of parallel bearings. The series are angularly disposed with respect to each other and the mounting of the rake wheels on one of the series constitutes the device either as a tedder or side delivery rake. It should further be noted that the coaxial bearings are intended for use when the device is employed as a tedder. The series of bearing members 6, 9, 13 and 15, however, are intended for use when the device is to be employed as a side delivery rake. In this latter arrangement, as well as in the tedder arrangement, the rake wheels are positioned in spaced parallel planes, and it will be noted that the frame extends between these planes, with the bearing members constituting supports on the frame for supporting the rake wheels for rotation by contact with the ground. In the arrangement where the device is a side delivery rake, the running wheel 29 is spaced laterally of the row of rake wheels and is further positioned behind the foremost of said rake wheels, to wit: the rake wheel 2. The other running wheel 28 is, in this arrangement, positioned on the other side of the row.

In the embodiment shown, the bearing members and the auxiliary bearing members for the rake wheels are fixedly attached to the support. They can, however, also be conventionally provided (see Patent 2,635,411; Hicks) with cranks to permit movements of the rake wheels in their own planes of rotation. When using fixed bearing members and auxiliary bearing members a rake wheel construction as described in the Dutch Patent 182,102 is preferred.

What we claim is:

1. A device for displacing material lying on the ground comprising a frame having the shape of a loop, a series of substantially coaxial bearings on and extending across said loop, and rake wheels operatively associated with said bearings for rotation thereupon to displace said material.

2. A device as claimed in claim 1 comprising a draw arm adjustably connected to said frame for controlling the direction of movement of the frame.

3. A device as claimed in claim 1 comprising a substantially linear series of parallel bearings on said frame, the second said series being angularly disposed with respect to the first said series, said rake wheels being selectively mounted on the bearings of one of said series.

4. A device as claimed in claim 1 comprising a series of parallel bearings on said frame, both said series including a common bearing, said rake wheels being selectively mounted on the bearings of one of said series.

5. A device as claimed in claim 1 comprising running wheels adjustably connected to said frame and controlling the direction of movement thereof.

6. A device as claimed in claim 1 wherein said loop includes opposite sides on which said bearing members are mounted, each bearing member supporting two of said bearings in spaced relation.

7. A device as claimed in claim 1 wherein said rake wheels are freely rotatable.

8. A device as claimed in claim 1 comprising a substantially linear series of parallel bearings on said frame at an angle with respect to the first said series, said rake wheels being detachable from the first said series and mountable on the bearings of the second said series whereby said device is adaptable for both teddering and side delivery operations.

9. A device as claimed in claim 1 wherein said loop is a substantially closed loop.

10. A device as claimed in claim 1 wherein said frame is a tube.

References Cited in the file of this patent

UNITED STATES PATENTS

| | | |
|---|---|---|
| 2,447,354 | Morrill | Aug. 16, 1948 |
| 2,635,411 | Hicks | Apr. 21, 1953 |
| 2,683,345 | Meyer | July 13, 1954 |
| 2,827,754 | Hill | Mar. 25, 1958 |